United States Patent [19]

Perry

[11] Patent Number: 5,170,933

[45] Date of Patent: Dec. 15, 1992

[54] REUSABLE AIR FREIGHT CONTAINER ASSEMBLY

[76] Inventor: Thomas J. Perry, Box 822, Fairhaven, Mass. 02719

[21] Appl. No.: 878,402

[22] Filed: May 4, 1992

[51] Int. Cl.⁵ .................................. 108 51.1; 108 55.5; 206 599; 206 600
[52] U.S. Cl. ................................................. 229/23 R
[58] Field of Search .................... B65D/88/10, 88/52; 229/23 R, 23 BT; 206/386, 599, 600; 220/1.5; 108/51.1, 52.1, 55.5, 56.1

[56] References Cited

U.S. PATENT DOCUMENTS

| | | | |
|---|---|---|---|
| 2,611,569 | 9/1952 | Coleman et al. ................... | 108/55.5 |
| 3,664,570 | 5/1972 | Kupersmit ........................ | 229/23 R |
| 3,955,700 | 5/1976 | Pedraza ............................... | 220/1.5 |
| 4,019,634 | 4/1977 | Bonnot ............................. | 229/23 R |
| 4,413,737 | 11/1983 | Wind ................................. | 206/599 |
| 4,693,411 | 9/1987 | Snyder ............................. | 229/23 R |
| 4,809,851 | 3/1989 | Oestreich, Jr. et al. ............ | 206/599 |
| 4,828,132 | 5/1989 | Francis, Jr. et al. ................ | 220/1.5 |
| 4,856,657 | 8/1989 | Shuert ................................. | 206/600 |
| 4,936,451 | 6/1990 | Shuert ................................. | 206/600 |
| 5,029,734 | 7/1991 | Nichols ............................... | 206/600 |

FOREIGN PATENT DOCUMENTS 20171 12/1980 European Pat. Off. .......... 229/23 R

Primary Examiner—Gary E. Elkins
Attorney, Agent, or Firm—Robert J. Doherty

[57] ABSTRACT

A shipping container especially adapted for air freight movement of perishable goods in which separable base, wall members, and cover portions are assembled and disassembled on site. The base is formed of a rigid preferably plastic material and is of a general planar configuration with a peripheral groove for receipt of wall members in turn preferably formed from corrugated cardboard and the like and which define lower peripheral edges such that the separate wall members may be forced into the grooves to construct a compartment for the receipt of the material being shipped. Upon reaching the destination, the assembly may be easily dismantled and the corrugated cardboard wall members either discarded or returned back to the point of origin along with a plurality of stacked rigid bases.

11 Claims, 3 Drawing Sheets

REUSABLE AIR FREIGHT CONTAINER ASSEMBLY

BACKGROUND AND OBJECTS OF THE INVENTION

This invention relates to a container and particularly to a container of the type which may be used to transport goods by air freight especially perishable goods which require refrigeration such as seafood or fresh flowers. In addition, the container assembly of the present invention is further constructed such that major portions thereof can be re-used and additionally stacked in nested storage for shipping back to the point of origin.

Various containers specifically adapted for use in air freight are known. For instance, in U.S. Pat. No. 4,212,406 issued July 15, 1980, a container appropriately shaped to fit a plane's cargo area is shown constructed of aluminum struts and in addition a container formed of a light weight frame having a skin of aluminum sheets and the like is discussed. This frame and skin container is still the industry norm, although it inherently includes several disadvantages including those mentioned in the aforementioned patent including heavy weight, vulnerability to damage, and high cost. A further disadvantages of aluminum containers of this nature is that aluminum is an easily recyclable metal and when scrap metal prices reach certain levels, for instance, 50¢ or 60¢ per pound, theft of these containers increases significantly.

Another container structure suggested by the prior art is that shown in U.S. Pat. No. 2,421,225 issued May 27, 1947 in which opposed U-shaped rigid members are inter-engaged with each other and then held in such position by tape and strapping. This concept is, however, cumbersome and not applicable for modern shipping procedures. A further known shipping container structure is that shown in U.S. Pat. No. 4,927,026 which essentially involves a knockdown reusable structure but which would appear to lack commercial potential because of its high cost. Other interesting containers of possible general interest include those shown in the following U.S. Pat. Nos. 4,852,741; 4,852,756; and 4,890,740.

Despite the several prior art constructions shown in the above-recited patents, there remains a need for a collapsible container assembly which is particularly adapted for air shipment and which does not sacrifice the convenience of a rigid container but which is low in cost, sturdy, and formed from materials which are unlikely to be stolen for their intrinsic value and which can be especially adapted for the transportation of refrigerated materials and the associated complexities which arise from handling melting ice commonly used to keep such products fresh.

Further characteristics and desirable features for a container assembly of this general nature is that it can be easily manipulated by fork lift truck blades and easily received by friction skids. Moreover, it would be desirable if the unit were stackable such that a number of empty units may be returned to their origin point in stacked form and in this manner significantly reduce the volume which would ordinarily be required to return a fixed-shaped container.

These and other objects of the invention are achieved by the provision of a reusable container assembly for use in transporting freight comprising a horizontally-disposed rigid lightweight plastic material base, said base having opposed upper and lower generally planar surfaces and a central floor, a peripheral flange upwardly extending about said floor and in part forming a generally U-shaped peripheral groove having a bottom formed by a peripheral portion of said upper base surface, first and second cardboard wall members each generally U-shaped and each having an end panel from which a pair of opposed side panels forwardly extend to define an open end distal from said each end panel and upper U-shaped and lower peripheral edges, said wall members each positioned on said base upper surface with the lower peripheral edges of each wall member positioned in said base peripheral groove, said wall member side panels at least partially overlapping each other, a top positioned on top of said wall members, and strapping means encircling said base, said wall members and said top so as to hold said assembly together.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DETAILED DESCRIPTION OF THE INVENTION

Figure 1:
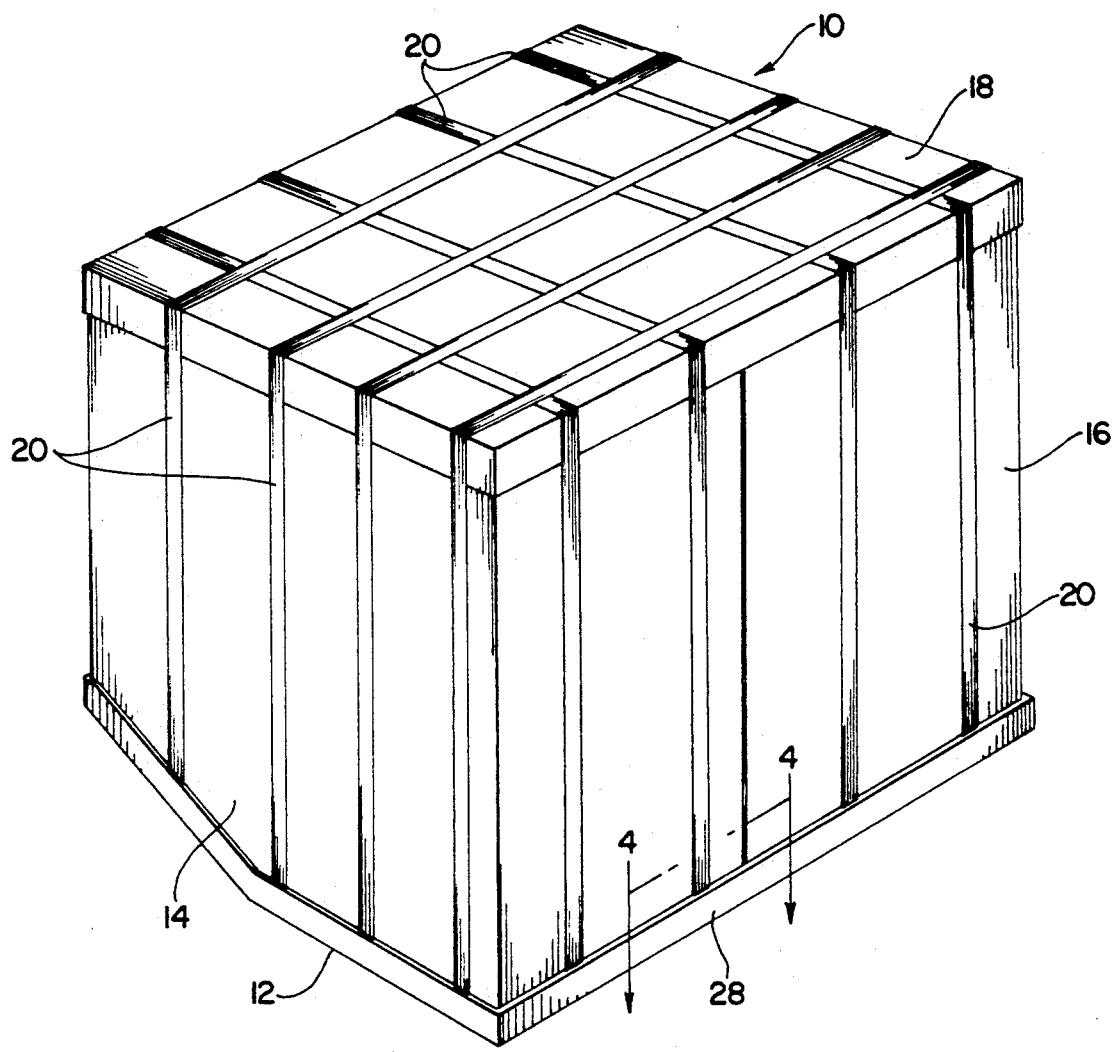
FIG. 1 is a front perspective view of the container assembly of the present invention in completely assembled condition ready for shipping.

Turning now to the drawings and particularly FIG. 1 thereof, the container assembly 10 of the present invention is shown in a fully assembled mode for shipping. Such container includes a base 12, a first wall member 14, a second wall member 16, and a top 18. The base, wall members and top are then encircled by a plurality of strapping bands 20 which essentially entirely encircle the assembly and preferably crisscross each other in side-to-side and front-to-rear planes.

Figure 2:
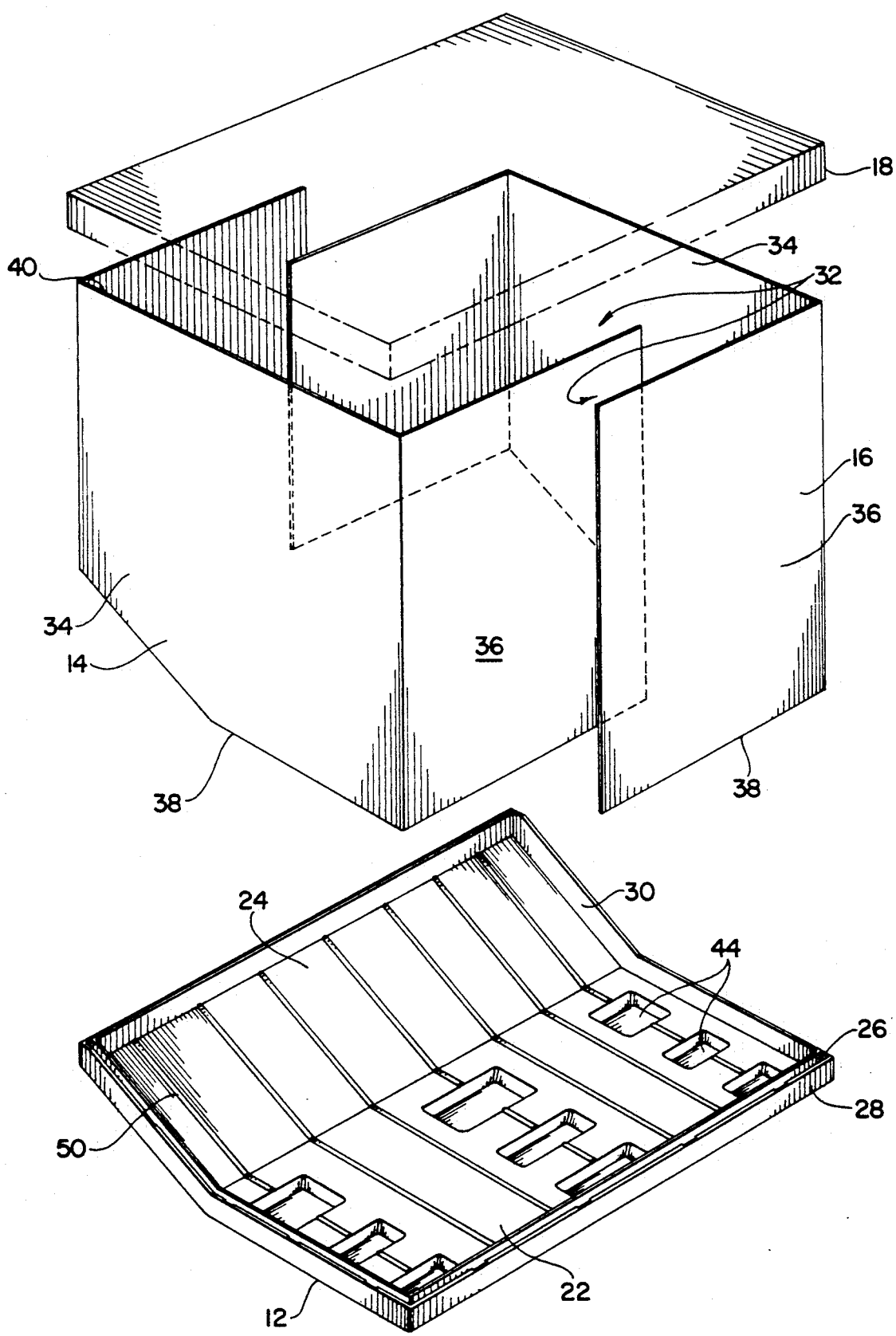
FIG. 2 is a front perspective view of the container assembly in partially assembled form arranged to particularly show the manner in which the component parts of the assembly interrelate to each other.
Figure 3:
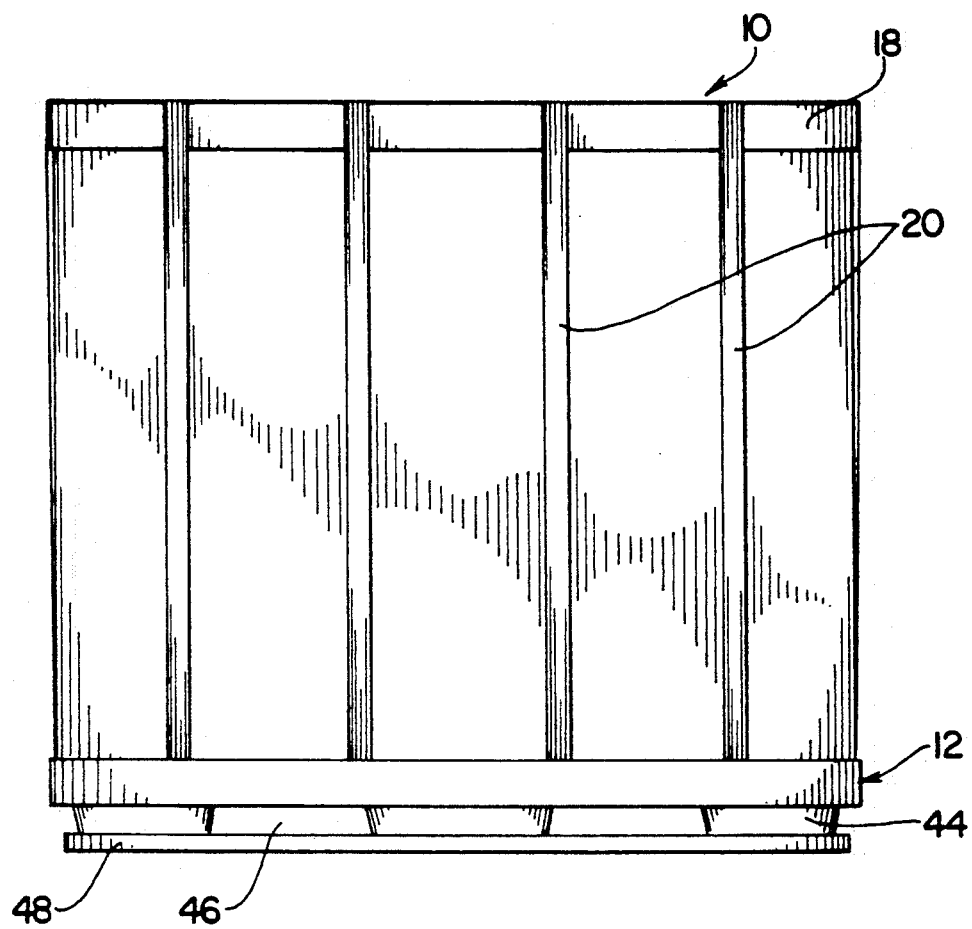
FIG. 3 is a front elevational view thereof.

Referring now particularly to FIG. 2, it will be apparent the container assembly 10 is easily assembled and disassembled from its aforementioned component parts. Therein it is best shown that the base 12 which is preferably formed from a rigid plastic material such as Fiberglas reinforced sheet. The base includes a generally planar central floor 22 which may be continued into an upwardly angled secondary floor 24 such that the overall container assembly 10 may conform to the walls of the airplane fuselage. Surrounding the base 12 is a peripheral groove 26 preferably formed by a pair of laterally-spaced peripheral flanges 28 and 30. The outer flange is designated by the reference numeral 28 and it is visible in the completed container assembly 10 whereas the inner flange 30 is hidden by the manner in which the cooperating wall members 14 and 16 interfit with each other as will be hereinafter more fully brought out.

The wall members 14, 16 are preferably formed of corrugated cardboard or fiberboard and are preferably of the identical size and thickness except that they are folded opposite to each other to represent open ends 32 which are adapted to face each other when the members 14, 16 are placed in nested relationship as shown in FIG. 2 and the transition between FIG. 2 and FIG. 1. Accordingly, each of the wall members 14, 16 include an end panel 34 adapted to be disposed on opposite sides of the base 12 and a pair of side panels 36 extending therefrom at right angles thereto such that the overall U-shaped configuration of the wall members is achieved. In those cases where the base central floor 22 includes the elevated secondary portion 24, the end panels 34 will be of pentagonal shape.

Figure 4:
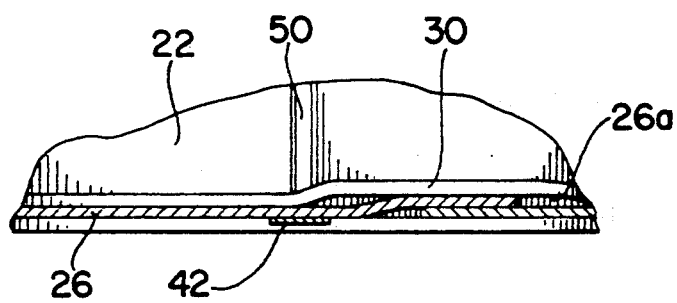
FIG. 4 is an enlarged sectional view taken along the line 4—4 of FIG. 1.

It will thus be apparent that the wall members further define a lower U-shaped peripheral edge 38 and an upper U-shaped peripheral edge 40. It is the U-shaped edges 38 which are adapted to engage the base of the U-shaped peripheral groove 26 formed in the base 12. The groove 26 is dimensioned in thickness to be slightly larger or to form a slight friction engagement with a single thickness wall member panels 34, 36 except where the side panels 36 overlap to form a double thickness in front and rear areas of the base 12. In these opposed areas, the groove 26, as best shown in FIG. 4, is provided with a double thickness portion or pocket 26a preferably defined by the inward disposition of the inner flange 30 in those opposed areas of double thickness.

In addition to the pockets 26a, the groove 26 is further provided with a plurality of vertically-oriented slots 42 which pass entirely through the floor 22 of the base 12 and which are preferably formed by a recess in the inner face of the outer flange 28. These slots 42 are present at a plurality of points preferably equally spaced around the base 12 periphery such that the straps or bands 20 may extend therethrough and around the bottom surface of the base and outer surfaces of the wall members 14, 16 and the top 20 to completely bind the container together so that it can withstand rough handling and the like. Prior to the assembly and tightening of the bands 20 which can be conventionally attached either by locking the open ends (not shown) thereof with a separate fastening device or by fusing them together or other known means, the top 18 is positioned over the upper peripheral edges 40 of the wall members 14, 16.

In addition to the above, it should be pointed out that the base floor 22 is provided with a series of depressions of various size and shape molded or otherwise formed therein. The depressions 44 are vertically-oriented and preferably separate from each other and aligned both side-to-side and front-to-rear to form spaces 46 therebetween for receipt of fork lift blades. In this manner then, it should be seen that the bottom of the depressions 44 form the composite surface on which the base 12 rests and that the outer lower base 12 surface is upwardly recessed therefrom by such provision to enable the convenient use of a fork lift truck or the like to move the full or empty container assemblies from one point to the other. In addition, the container assembly 10 is normally provided with a skid plate 48 attached to the bottom of the depressions 44 in any convenient manner as by gluing or adhesive attachment so that the container assembly 10 may be conveniently moved on rollers or other frictional skids.

When the container assembly 10 is partially assembled as when the wall members 14, 16 are forced into the groove 26 but prior to the placement of the top 18 thereon, the container may be filled with the desired material to be shipped and refrigerant such as crushed or chopped ice may be placed on the floor 22 upper surface or upon the material being transported. During shipment, such refrigerant, i.e., ice, may melt and the water formed thereby is free to flow into the depressions 44 and, accordingly, reduce the contact between the shipped material and water that would be otherwise free to accumulate on the floor bottom 22 and come in contact with the material being shipped or additionally slosh back and forth causing irritating noise and weight displacement. Also especially when salt water fish are transported in the container assembly, the natural tendency for corrosion to occur in prior art structures especially at rivets or other joints is eliminated by the present invention along with the chances of possible leakage. Thus not only are potential leak openings eliminated by avoiding rivets, etc., but corrugated cardboard tends to swell when wet and thus form an even tighter fit vis-a-vis the groove 26 in the event the wall members should become wet.

When the filled container reaches its destination, the strapping bands 20 are simply cut or otherwise removed from the top and wall panels whereupon the top and wall panels may be discarded, used for other purposes or laid flat and reshipped in stacked form to the origin point or other area. In addition, the plurality of the rigid bases 12 from other container assemblies 10 may be stacked on top of each other and also shipped to their point of origin and in doing so all component parts of the container assembly require much less space then they would have if the overall outside structure of the container were fixed. The upper floor surface 22 may also be provided with stiffening ribs 50 which further serve to channel water and to assist in spacing the contents of the container from the upper surface of the central floor 22.

Accordingly, it may be seen that a container assembly 10 as described above accomplishes all of the objectives of the present invention in a straightforward, direct and useful manner.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A reusable container assembly for use in transporting freight comprising a horizontally-disposed rigid lightweight plastic material base, said base having opposed upper and lower generally planar surfaces and a central floor, a peripheral flange upwardly extending about said floor and in part forming a generally U-shaped peripheral groove having a bottom formed by a peripheral portion of said upper base surface, first and second cardboard wall members each generally U-shaped and each having an end panel from which a pair of opposed side panels forwardly extend to define an open end distal from said each end panel and upper U-shaped and lower peripheral edges, said wall members each positioned on said base upper surface with the lower peripheral edges of each wall member positioned in said base peripheral groove, said wall member side panels at least partially overlapping each other, a top positioned on top of said wall members, and strapping means encircling said base, said wall members and said top so as to hold said assembly together.

2. The container assembly of claim 1, said strapping means comprising a plurality of separate bands encircling said assembly in two different planes in turn disposed generally normal to each other.

3. The container assembly of claim 1, said peripheral groove having a plurality of separate peripherally-spaced open-ended slots passing vertically therethrough for receipt of said strapping means.

4. The container assembly of claim 2, said peripheral groove having a plurality of separate, peripherally-spaced, open-ended slots passing vertically therethrough for receipt of said bands.

5. The container assembly of claim 3, said peripheral groove formed by a pair of laterally-spaced, peripheral flanges both of which in turn upwardly extend from the upper surface of said base, each said flange having an inner surface opposed to each other wherein the lateral spacing of said flange defines the lateral extent of said groove, each of said slots formed by one of said flanges and extending into the inner surface thereof.

6. The container assembly of claim 1, said peripheral groove formed by a pair of laterally-spaced peripheral flanges both of which in turn upwardly extend from the upper surface of said base, each said flange having an inner surface opposed to each other wherein the lateral spacing of said flange inner surfaces defines the lateral extent of said groove, said groove of a lateral extent to receive a single thickness wall member except where said side panels overlap each other wherein said groove is of an increased thickness.

7. The container assembly of claim 1, said base being generally rectangular with opposed forward and rear edges and intermediately opposed side edges, the end panels of said wall members disposed in those portions of the groove proximal said base side edges and the side panels of said wall members disposed in those portions of the groove proximal said base forward and rear edges.

8. The container assembly of claim 7, said base having a plurality of separate depressions in said central floor and in turn extending below the lower generally planar surface thereof, said depressions forming pockets for receipt of fluids drained from materials stored in said container.

9. The container assembly of claim 8, said depressions aligned in rows both side to side and forward to rear so as to define a series of laterally-spaced channels below said central floor for receipt of fork lift blades.

10. The container assembly of claim 9, wherein a bottom friction plate is attached to said base, the bottom surfaces of said depressions resting on said bottom plate.

11. The container assembly of claim 1, said base central floor having a secondary portion angularly extending therefrom along the rear thereof and wherein said wall member end panels being pentagonal shape.

* * * * *